United States Patent Office 2,945,170
Patented July 12, 1960

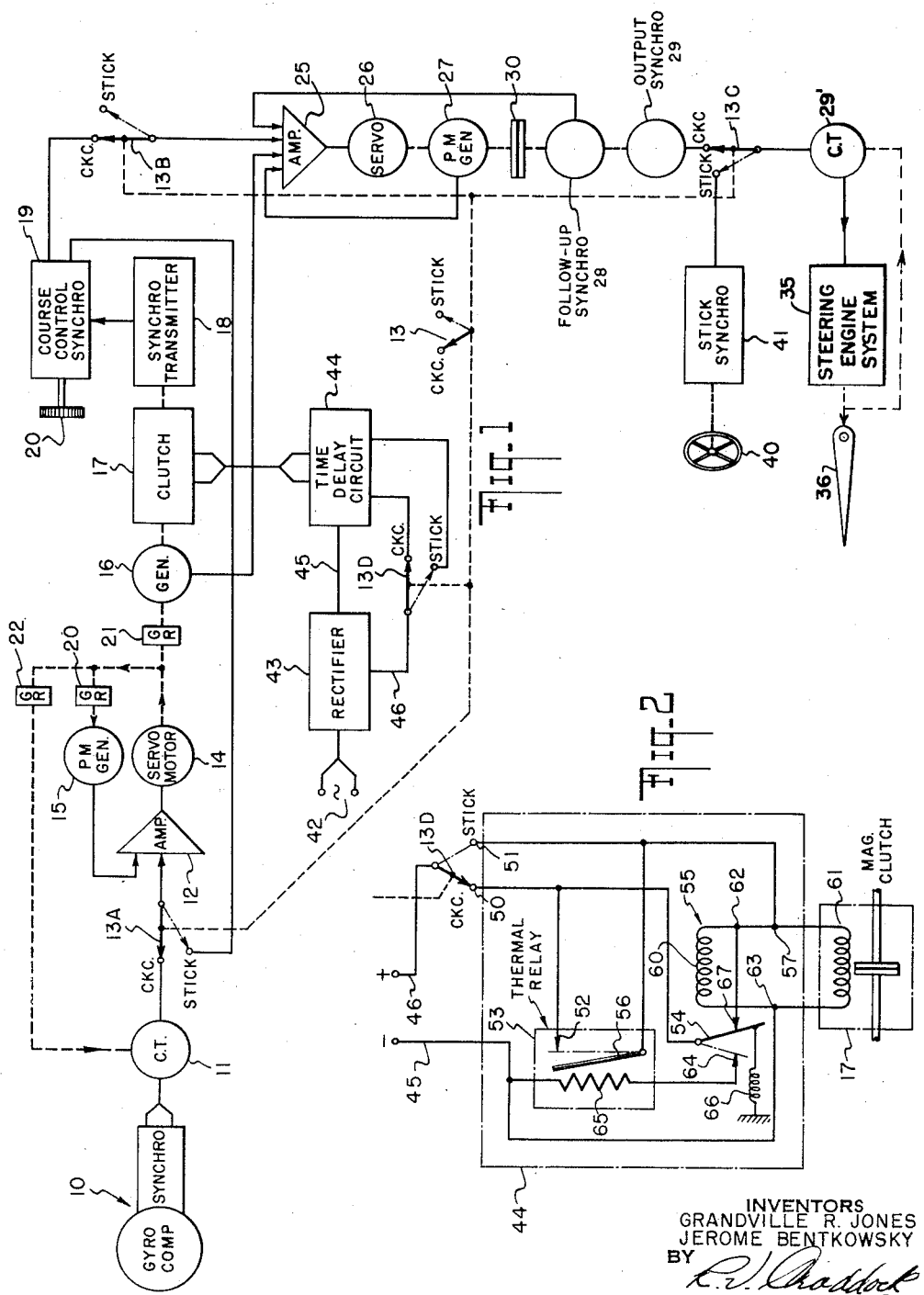
July 12, 1960 — G. R. JONES ET AL — 2,945,170
STEERING SYSTEMS FOR NAVIGATIONAL CRAFT
Filed Nov. 8, 1957
INVENTORS
GRANDVILLE R. JONES
JEROME BENTKOWSKY

2,945,170

STEERING SYSTEMS FOR NAVIGATIONAL CRAFT

Grandville R. Jones and Jerome Bentkowsky, Charlottesville, Va., assignors to Sperry Rand Corporation, a corporation of Delaware Filed Nov. 8, 1957, Ser. No. 695,432

7 Claims. (Cl. 318—489)

This invention relates to steering systems primarily for marine craft having a course selecting or correcting means whereby the craft may be made to proceed to and maintain any preselected heading.

A particular feature of the present invention resides in the provision for electrically synchronizing elements of the steering system. In particular, it concerns means for synchronizing the course selecting or correcting means with the reference signal providing means to avoid heading errors when switching from manual to automatic control.

Therefore, it is an object of the present invention to provide for synchronization of the elements of a steering system to avoid errors when switching from one mode of operation to another.

It is a further object of the present invention to provide a means for synchronizing a steering system which is simple, fast-acting and positive in operation.

The aforementioned objects are achieved by continuously wiping out the course correcting signals during the manual mode that were previously introduced during the automatic mode and also those signals inadvertently introduced into the system during manual operation of the system and by synchronizing the course correcting means of the reference signal means upon switching to automatic operation. When the system is switched from manual operation to an automatic course keeping mode of operation, the course correcting means is synchronized to the reference signal means by a switching device that simultaneously de-energizes a clutch via time delay means and connects the signal reference means into the system. For a predetermined time delay, the course correcting means is declutched from the signal reference means until the system is synchronized. Thereafter, the system automatically operates in the course keeping mode without inadvertent heading errors.

These and other objects and advantages of the present invention will become obvious to those skilled in the art by referring to the following drawings wherein like reference characters indicate like elements, in which:

Fig. 1 is a schematic wiring diagram of a steering system incorporating the present invention; and Fig. 2 is a detailed wiring diagram of the time delay and magnetic clutch elements shown in Fig. 1.

Referring now to Fig. 1, a reference signal means such as gyro compass and associated synchro transmitter 10, is shown connected to synchro control transformer 11 to provide a signal indicative of ship's heading.

Amplifier 12 is selectively connected to receive the output from synchro control transformer 11 via contact arm 13A of switch 13 when switch 13 is in the automatic, i.e. "course keeping control" (CKC) position. Switch 13 has contact arms 13A, 13B, 13C and 13D that are ganged together for simultaneous operation in a manner to be described.

Amplifier 12 is controllably connected to servomotor 14. Servomotor 14 is connected to drive permanent magnet generator 15 via suitable reduction gearing 20 in such a manner that the output of generator 15 produces a feedback signal to the input of amplifier 12 for the purpose of servo stabilization. Servomotor 14 also drives variable field generator 16 via suitable reduction gearing 21 to produce a D.C. voltage proportional to the craft turning rate. The output of generator 16 is connected to provide an input to amplifier 25. Servomotor 14 is also connected to drive the rotor of control transformer 11 via suitable reduction gearing 22.

The output shaft of servomotor 14 is also connected to one side of magnetic clutch 17; the other side of clutch 17 is connected to drive the rotor of synchro transmitter 18 in a manner to be described. The electrical output of synchro 18 is connected to the course selecting or correcting synchro 19, which may be of the control transformer type. In the "CKC" mode, course corrections are introduced into the system by means of knob 20 that is connected to settably adjust course correcting synchro 19 by positioning the rotor thereof. The output of the course correcting synchro 19 is connected to amplifier 25 when contact arm 13B of switch 13 is in the "CKC" position. The output of course correcting synchro 19 is also connected in feedback fashion to amplifier 12 via contact arm 13A when switch 13 is in the manual or hand electric, i.e. "stick" position, as shown in dotted lines on the drawing.

Amplifier 25 is connected to control servomotor 26. The output shaft of servomotor 26 is connected to drive permanent magnet generator 27 which has an electrical output connected to amplifier 25 in feedback fashion for purposes of servo stabilization. The output shaft of servomotor 26 is also connected to follow-up synchro 28 and output synchro 29 through slip clutch 30. The output of synchro 28 is connected to amplifier 25 in feedback fashion. The output of synchro 29 is connected to a receiver synchro or control transformer 29' in the steering servo 35 via contact arm 13C when switch 13 is in the "CKC" position. The steering servo 35 is drivably connected to the rudder 36 of the craft.

When the contact arm 13C of switch 13 is in the "stick" position, as shown in dotted lines, the steering servo 35 is drivably connected to the helm or stick 40 via stick synchro 41, thereby selectively providing means for manually steering the craft through control transformer 29'.

In order to synchronize the course correcting synchro 19 with the gyro compass 10 upon switching from "stick" to "CKC" mode of operation, an electrical circuit means is provided for controlling magnetic clutch 17. The circuit includes a suitable power source 42 connected to a rectifier 43. The rectifier 43 is connected directly to time delay circuit 44 via lead 45 and is also connected to time delay circuit 44 by lead 46 through contact arm 13D of switch 13. Time delay circuit 44 is operatively connected to magnetic clutch 17. The detailed circuitry of time delay circuit 44 is shown in Fig. 2.

Referring to Fig. 2, lead 46 is connected to contact arm 13D that in turn may be selectively connected to contact 50 in the "CKC" mode or contact 51 in the "stick" mode. Contact 50 is connected to contact 52 of thermal relay 53 and to contact arm 54 of magnetic relay 55. Contact 51 is connected to contact arm 56 of thermal relay 53. Contact 51 is also connected to one end of winding 60 of magnetic relay 55 and to one end of winding 61 of magnetic clutch 17 via junction 57. The respective ends of windings 60 and 61 are connected together at junctions 57 and 63. Contact 67 of relay 55 is connected to one end of windings 60 and 61 at junction 62. The other end of windings 60 and 61 connect to lead 45 via junction 63. Contact 64 of relay 55 is connected to lead 45 via thermal element 65 of thermal relay 53. Contact arm 54 of relay 55 is spring loaded to hold contact arm 54 against contact 64 unless winding 60 of relay 55 is energized by spring 66.

Referring now to Fig. 1 for the operation of the steering system, with the system in the "CKC" mode of operation the gyro compass 10 provides heading data to control transformer 11 and then to amplifier 12 via contact arm 13A to drive servomotor 14 in accordance with said signal. Thus, servomotor 14 follows any heading changes detected by gyro compass 10 and drives the rotor of control transformer 11 in accordance therewith. Generator 15 produces a feedback signal to the servo amplifier 12 for the purpose of servo stabilization proportional to the velocity of servomotor 14.

Servomotor 14 also drives generator 16 to provide a D.C. voltage proportional to the craft's turning rate to amplifier 25. With the clutch 17 engaged during normal operation in the "CKC" mode, the servomotor 14 drives synchro transmitter 18 as an auxiliary gyro compass transmitter to provide a signal to the course correcting synchro 19 in accordance with the gyro compass data. A change in heading may be effected by positioning knob 20 to move the rotor of course correcting synchro 19 such that synchro 19 produces an input signal proportional to the deviation of the craft from the ordered heading. This signal, known as course error, is applied via contact arm 13B to amplifier 25. The output of amplifier 25 drives servomotor 26 until synchro 28 generates a follow-up signal to the input of amplifier 25 sufficient to cancel the summation of the turn rate and course error signals. The signal from servomotor 26 is transmitted to the rudder positioning equipment, i.e. steering servo 35, by synchro 29 via contact arm 13C. Generator 27 provides a feedback signal to amplifier 25 for purposes of stabilization.

In the manual or "stick" operation, the helm or stick 40 is moved to effect the desired course change, and this signal is transmitted by synchro 41 via contact arm 13C, which is now in the "stick" position, to steering servo 35 to position rudder 36.

It is particularly important when switching from one mode of operation to another, i.e. from "stick" to "CKC" or back again, to maintain the entire system synchronized. The primary reason for having synchro 18 synchronize course control synchro 19 while in the "stick" position is to cancel out or remove any deliberate course correction or course change previously introduced while in the "CKC" mode. If previously made course corrections were not removed or zeroed from the system while the system is in the "stick" mode, these corrections would appear as course errors after switching back to the "CKC" mode. Normally, course corrections may be required while in the "CKC" mode to offset timing errors in switching from "stick" to "CKC" mode, to maintain a rudder bias to counteract wind, sea or unequal propeller speeds or to compensate for unbalance in the servo systems as well as other reasons.

A secondary consideration is the elimination of any heading errors that may be inadvertently introduced. Thus, for example, if inadvertent adjustment of the course corrector knob 20 occurs when the system is in the "stick" position, it does not cause a loss of synchronism between the course corrector synchro 19 and synchro 18. Also, if the steering control is transferred while the "CKC" system is correcting for a course error, the servo system should synchronize itself. With switch 13 in the "stick" position, an output from course corrector synchro 19 to amplifier 12 is provided via contact arm 13A in order that with clutch 17 energized any inadvertent positioning of knob 20 will be wiped out by the operation of servomotor 14 synchronizing synchro 18 with course corrector synchro 19. In the "stick" position, the amplifier 12 is disconnected from gyro compass 10 and synchro 19 is disconnected from amplifier 25.

When the system is re-engaged to a "CKC" mode of operation by moving switch 13 to the "CKC" position, the clutch 17 is de-energized in a manner to be described and the servomotor 14, which was previously synchronized with course corrector 19, now synchronizes with the gyro compass 10 via synchro 11 which provides an output to amplifier 12 through contact arm 13A. After a suitable time delay, such as two seconds, determined by time delay circuit 44, clutch 17 is again energized thereby coupling synchro 18 to servomotor 14. Uncoupling of the clutch 17 prevents loss of synchronism between course corrector synchro 19 and synchro 18 while servomotor 14 is synchronizing with the compass heading. With clutch 17 energized, course corrector synchro 19 again provides a course error signal to amplifier 25 via contact arm 13B, as previously described.

Referring now to Fig. 2, the details of the operation of time delay circuit 44 will be described. Assuming the system is in the "stick" control mode, as shown in dotted lines, with contact arm 13D connected to contact 51, the current path would then be through lead 46, contact arm 13D, contact 51, junction 57, winding 61, thereby energizing clutch 17 and returning through junction 63 to lead 45. Winding 60 is also energized to hold contact arm 54 of relay 55 against contact 67.

At the instant switch 13 is switched to the "CKC" mode of operation, the circuit through winding 61 is broken, thereby de-energizing clutch 17. The circuit through winding 60 is also broken, thereby allowing contact arm 54 of relay 55 to move to the dotted line position to connect with contact 64 under the action of spring 66. Current will now flow from lead 46 through contact arm 13D, contact 50, contact arm 54, contact 64, through thermal element 65 of thermal relay 53 back to lead 45. After a suitable time delay, for example, two seconds, thermal element 65 will be heated sufficiently to position contact arm 56 of thermal relay 53 to its dotted line position to connect with contact 52. A current path will then exist through lead 46, contact arm 13D, contact 50, contact 52, contact arm 56, junction 57, windings 60 and 61 back to lead 45. When energized, winding 61 engages magnetic clutch 17 while winding 60 causes contact arm 54 to engage contact 67. When contact arm 54 engages contact 67, a circuit is established through windings 60 and 61 to maintain them in their present condition, i.e. energized. Disconnecting contact arm 54 from contact 64 breaks the circuit through thermal element 65 thereby allowing it to cool off thus opening the circuit through contact arm 56 via contact 52 to allow the thermal relay 53 to be ready for the next cycle. During this time, the clutch 17 remains energized and engaged as previously explained.

When the system is returned to the "stick" mode of operation, contact arm 13D of switch 13 is moved to the "stick" position thereby continuing to energize the clutch 17 and, since the time interval of transfer is very short, relay 55 remains in the same position and clutch 17 remains engaged.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a steering system for marine craft having a steering member, reference signal means, first servo means selectively responsive to said reference signal means for providing a signal in accordance therewith, settable course correcting means selectively responsive to said first servo means for providing a signal in accordance with the deviation of the craft from the set course, second servo means selectively responsive to said signal from said course correcting means for controlling said steering member, disabling means intermediate said first servo means and said course correcting means for disabling the connection therebetween, time delay means selectively operable to render said disabling means effective for a predetermined time interval, means for simultaneously selectively rendering said first servo means responsive to said reference signal means and unresponsive to said course correcting means, during said time interval, and means responsive to the termination of the time interval of said time delay means for rendering said course correcting means responsive to said reference means.

2. In a craft steering system adapted for controlling a steering member, directional reference means for providing a signal in accordance with the heading of the craft, manually adjustable course correcting means, control means in controlling relation to said steering member and responsive to the deviation of the craft from the course determined by said course correcting means for automatically steering said steering member, means for direct manual steering of said steering member, and means including switch means for selectively transferring the control of said steering member from automatic steering to manual steering and back again to automatic steering without introducing heading errors.

3. In a craft steering system of the character described in claim 2 wherein said last mentioned means includes means for simultaneously disconnecting the steering member from automatic steering and connecting it to manual steering, disconnecting said directional reference means, and connecting said course correcting means in a follow-up condition when switching from automatic steering to manual steering.

4. In a craft steering system of the character described in claim 2 wherein said last-mentioned means includes means for simultaneously disconnecting the steering member from manual steering and connecting it to automatic steering, disconnecting said course correcting means from a follow-up condition and after a predetermined time delay connecting said directional reference means to said course correcting means when switching from manual steering to automatic steering.

5. A craft steering system having first and second modes of operation comprising, directional reference means connected to a first synchro, a first servo connected through a clutch to a second synchro, course control means, a second servo connected to a rudder, a steering wheel, time delay means controlling said clutch and a plurality of switches each having first and second positions arranged when in a first position for effecting a first mode of operation thereby connecting the directional reference means to the first servo and the course control means to the second servo and when moved to said second position to effect said second mode thereby connecting the course control means to the first servo and disconnecting the course control means from the second servo and connecting the steering wheel to the second servo and arranged on moving said switches from the second position to the first position to disconnect the steering wheel from the second servo and to energize said time delay means for a predetermined period to declutch said clutch and to connect said directional reference means to said first servo and at the end of said predetermined period to clutch said clutch.

6. In a steering system for navigational craft having a plurality of modes of operation and a rudder controlling servomotor, directional reference means for providing a signal in accordance with the heading of the craft connected to a first synchro, a first servomotor connected to said first synchro and also connected through a clutch to a second synchro, manually adjustable course correcting means responsive to said second synchro, control means in controlling relation to said rudder controlling servomotor and responsive to the deviation of the craft and course determined by said course correcting means, means for direct manual steering of said rudder controlling servomotor, time delay means controlling said clutch, and a plurality of switches each having first and second positions arranged when in a first position for effecting a first mode of operation thereby connecting the first synchro to the first servomotor and the course correcting means to the control means and when moved to a second position to effect a second mode of operation thereby connecting the course correcting means to the first servomotor and disconnecting the course correcting means from the control means and connecting the steering wheel to the rudder controlling servomotor and arranged on moving said switches from the second position to the first position to disconnect the manual steering means from the rudder controlling servomotor and to energize the time delay means for a predetermined period to declutch said clutch and to connect the first synchro to the first servomotor and at the end of said predetermined period to clutch said clutch.

7. A steering system for navigable craft having servomotor means for controlling the operation of a steering control surface of the craft and adapted to control the course of the craft from a plurality of course control devices, said system comprising a first course control device connected to control said servomotor means and including a course reference apparatus and a follow-up means controlled thereby for defining a reference course, course correcting means normally coupled to said follow-up means for providing an output in accordance with a desired change in the course defined by said reference means, a second course control device, selective means for selectively controlling said servomotor means in accordance with said first or second course control device including first switch means responsive to an operation of said selective means to a position which renders said second course control means effective to control said servomotor for disconnecting said follow-up means from said reference apparatus and for connecting the output of said course correcting means as an input to said follow-up means whereby to reduce any output signal therefrom to zero, and second switch means including time delay means controlled thereby and responsive to an operation of said selective means to a position which renders said first course control means effective to control said servomotor for decoupling said course correcting means from said follow-up means and for connecting said follow-up means in follow-up on said reference device for a predetermined time interval whereby to synchronize said follow-up means with said reference means, and after said predetermined time period to re-couple said course correcting means to said follow-up means and to maintain said follow-up means connected with said reference means.

References Cited in the file of this patent

UNITED STATES PATENTS 2,589,834     MacCallum _____ Mar. 18, 1952